United States Patent [19]
Amon et al.

[11] Patent Number: 5,630,869
[45] Date of Patent: May 20, 1997

[54] REVERSIBLY PHOTOCHROMIC PRINTING INKS

[75] Inventors: Albert Amon; Haim Bretler, both of Lausanne, Switzerland; Anton Bleikolm, Ecublens, Austria

[73] Assignee: Sicpa Holding S.A., Switzerland

[21] Appl. No.: 143,448

[22] Filed: Jan. 12, 1988

[51] Int. Cl.⁶ .................................................. C09D 11/02
[52] U.S. Cl. .................................. 106/31.37; 523/161
[58] Field of Search ............................ 106/21, 23, 493, 106/499, 500, 501, 21 R, 21 A, 22 C; 260/DIG. 38; 430/308, 345; 427/213.3, 213.35, 312.36, 221

[56] References Cited

U.S. PATENT DOCUMENTS

| | | | |
|---|---|---|---|
| 4,064,287 | 12/1977 | Lipson et al. | 427/53 |
| 4,166,043 | 8/1979 | Uhlmann et al. | 428/403 |
| 4,199,359 | 4/1980 | Weigl et al. | 430/308 |
| 4,400,216 | 8/1983 | Arora | 106/23 |
| 4,654,082 | 3/1987 | Frilette | 106/30 |
| 4,931,220 | 6/1990 | Haynes et al. | 524/83 |

FOREIGN PATENT DOCUMENTS

| | | |
|---|---|---|
| 116520 | 11/1975 | German Dem. Rep. . |
| 2192006 | 12/1987 | United Kingdom . |
| 8300568 | 2/1983 | WIPO . |

OTHER PUBLICATIONS

A.E.J. Wilson, "Applications of Photochromic Polymer Films", *Phys. Technol.*, vol. 15, 1984, pp. 232–239.

WPI (Derwent) Abstract No.: 76–63652X/34, German Patent No. DE 2456432, Aug. 12, 1976.

WPI (Derwent) Abstract No.: 75–56321W/34, Japanese Patent No. JP 50020084, Mar. 3, 1975.

WIP (Derwent) Abstract No.: 81–46866D/26, Japanese Patent No. JP 56053158, May 12, 1981.

*Primary Examiner*—Scott W. Houtteman
*Attorney, Agent, or Firm*—Ostrolenk, Faber, Gerb & Soffen, LLP

[57] ABSTRACT

Photochromic printing inks are disclosed which are in particular used for the printing of security documents. Prints are normally nearly colorless and become colored when energy irradiated, such as by ultraviolet light. This photo-coloration is reversible. The printing inks contain photochromic compounds which are protected against other ink components. Methods are described to prepare the inks, to print security documents, and to detect counterfeiting.

2 Claims, No Drawings

REVERSIBLY PHOTOCHROMIC PRINTING INKS

FIELD OF THE INVENTION

This invention belongs to the field of printing inks. More particularly, it is related to printing inks for the printing of documents to give stable prints which, when exposed to energy radiation such as light, will give a reversible color change called photochromism.

DESCRIPTION OF THE PRIOR ART

Photochromism, sometimes also called phototropy, has been discovered by Marckwald in 1899. It can be defined as the property of a composition to change its visible light absorption spectrum on exposure to energy radiation of a certain wavelength or wavelength range such as ultraviolet light, capably of being absorbed by said composition. The original absorption spectrum is generally restored, after a certain time, in the dark or on gentle heating. Already by 1904, a class of photochromic compounds commonly referred to as "fulgides" has been discovered by Stobbe [Chem. Ber. 37, 2236 (1904)].

Interesting photochromic compounds are colorless in their normal state and become colored on exposure to activating radiation. The color formation generally comprises a ring closure or ring opening in the molecule with the formation of conjugated double bonds; ionic mechanisms are generally involved in these reactions.

Photochromic compounds and compositions have excited increasing technical and commercial interest during the last 15 years. Numerous photochromic compounds have been synthesized and published. The applications which have become known are methods for optical data storage, sunglasses, copying devices, and photographic techniques such as holography.

Several different families of photochromic materials have been reported, and a range of different colors, produced by photochromism, with particular characteristics is available today. However, whereas the use of photochromic compounds for printing purposes has already been suggested, no printing ink formulation has become known yet. This seems to be due to the fact that photochromic compounds are generally highly reactive and normally undergo chemical and photochemical changes in the complex medium of printing inks.

Nevertheless, attempts have been made to render photochromic compounds more stable in order to allow their use in printing inks. Thus, U.K. patent specification no. 1,602, 755 suggests the reactions of photochromics of the fulgimide class, i.e. substituted bismethylene succinic amide derivatives, with dihalogeno or trihalogeno triazines to obtain a mono or dihalogeno triazino derivative which may be considered as a reactive dyestuff, and the patent suggests the application of these compounds in the printing of security documents, including bank notes, as a precaution against forgery. However, no printing ink nor any indication how to proceed for obtaining a printing or printed security documents are disclosed.

In an analoguous but different manner, the published international patent application no. WO 83/00568 describes the preparation of a particulate photochromic material by adding a photochromic compound to finely divided clay, kaolin, barium titanate, bentonite etc. to produce a pigment. However, here again, no printing ink is disclosed in the Examples. No suggestions can be found how to print security documents.

Attempts to formulate various printing inks, using different classes of photochromic compounds, completely failed. The tests have shown that photon induced side reactions and oxidation rapidly result in the total loss of the photochromic effect. However, there is an urgent need for printing inks useful for printing documents to carry marks normally invisible to the human eye but which become visible after exposure to an activating radiation, especially for security documents in order to detect or prevent forgery or counterfeiting.

OBJECTS OF THE INVENTION

The first and major object of this invention is to provide printing inks containing a reversibly photochromic compound, whose components do not interfere with the photochromic compound and which give stable photochromic effects.

Another important object of the invention is to provide such printing inks, formulated in view of their application in every one of the various printing methods, which give on conventional substrates photochromic printings having good long-lasting stability properties.

A further object of this invention is to provide photochromic printing inks fulfilling the above described conditions wherein the photochromic components have good photosensitivity, a high color-changing reaction speed, a sharp photochromic color change and an acceptable high number of color change cycles.

A further object of the invention is to provide photochromic printing inks especially adapted to their application in the field of security documents in order to detect or prevent forgery.

A further and important object of this invention is to provide photochromic printing inks whose physical and chemical properties as well as the behaviour on printing machines are such that these inks can be used simultaneously with conventional printing inks or even in admixture with these known inks, in the printing of security documents to confer photochromic properties to them.

Another object of the invention is to provide methods of incorporating appropriately selected photochromic compounds into said printing inks and to develop methods for the preparation of such printing inks, adapted to be used in every one of the known printing techniques.

Still a further object of this invention is to provide protection systems for photochromic compounds within printing inks and within the prints obtained therefrom, in order to achieve or increase their stability against chemical, radiation and heat induced desactivation.

Another object of the invention is to provide methods for testing documents which have been marked with a print obtained from the printing inks of this invention.

SUMMARY OF THE INVENTION

Now, it has surprisingly been found that photochromic compounds can be used in printing inks when care is taken and special measures are applied to protect these compounds from desactivation by oxygen and detrimental chemical influences, in particular from ionic ones, during the formulation and the use of printing inks.

The above defined objects and still others are attained by the invention which in its broadest aspect, provides protection of the photochromic compounds from chemically and energy induced alterations, by embedding the photochromic compounds into a light-transparent, inert polymeric protecting composition being a barrier for oxygen and for components of the printing ink which would interact with the photochromic reaction sites of the photochromic compounds.

This embedding can be effected by incorporating the photochromic compounds, before their blending into an ink formulation, into a polymeric composition which is then broken into lumps and subsequently micronized to a particle size of from 1 to 20 micrometers. Another method is to encapsulate the photochromic compounds by the process of coacervation or encapsulation to form microcapsules, a method known per se, wherein the photochromic compound is enveloped by a thin shell of an inert light-transparent polymer. These two embedding methods result in new and useful dyestuff compositions having the general properties of organic pigments.

An embedding of the photochromic compound into a protecting polymer can also be achieved during and after printing when the photochromic compound is directly incorporated into a printing ink formulation. However, bearing in mind that the photochromic compounds must be protected, according to the invention, from any detrimental influences impairing the desired properties of the photochromic compounds in the printing inks, especially long-time stability, oxygen stability, speed of color change and sharpness of color change, and selectivity of photochromic wavelength, the inks must be formulated such that they do not contain certain components. The inks must be devoid of any compounds irreversibly interfering with the photochemical coloration mechanism of the photochromic compounds. Details will be discussed later.

DETAILED DESCRIPTION OF THE INVENTION

In the following description, abbreviations will be used for the sake of shortness. "Photochromic" or "photodye" means a photochromic compound. "Photodye-stuff" means an organic pigment-like particulate photochromic composition where the photochromic is surrounded by a protecting polymer, according to the invention. "Chemical hardening" or "chemical drying" means the polymerization, curing or crosslinking of printing ink binder precursors. "Physical drying" means solidification by the mere evaporation of solvents.

Furthermore, the term "photochromism" or "photochromic condition" as used herein, is meant to define the capability to change the color, generally from colorless to any visible coloration, after exposure for at most about 5 minutes to an energy radiation source having a wavelength comprised from about 200 to about 1100 nm. The change of absorption behavior may occur instantaneously on exposure to the ideal wavelength of the particular photochromic reaction or after overcoming any activation phase.

The term "color" or "coloration" is to be understood as the overall absorption characteristic within the same range of wavelengths of the electromagnetic spectrum. The color must be reversible and should last for a time period comprised from picoseconds up to about 30 minutes. Reversibility, i.e. color cancellation, may be accelerated by heating or by exposure to a distinct wavelength radiation different from that of the first coloration.

The photochromics which can be used in the printing inks of this invention, are generally already known substances selected from three main classes A, B, and C hereinafter described.

Class A encompasses spiro-indolino-naphthoxazines as disclosed in U.S. Pat. Nos. 3,562,172, 4,342,668, 4,440,672 and 4,699,473. In these compounds, basically the same photocoloration reaction is involved as in the photochromics of class C. Class A further comprises spirobenzopyranes as described in Japanese patent publication no. 61-1004, published 13 Jan. 1986. They are chemically closely related to the above cited photochromics of Class A and have still the same photocoloration mechanism.

Class B comprises fulgides and fulgimides, disclosed for example in U.S. Pat. Nos. 4,182,629, 4,145,536, 4,220,708, and U.K. patents no. 1,442,628 and 2,002,752. Fulgides are derivatives of bis-methylene succinic anhydride, and fulgimides are derivatives of bis-methylene succinic imide where the imide nitrogen may be substituted by alkyl, aryl or aralkyl.

Class C comprises spiro(1,8a)-dihydroindolizines, disclosed and described for example in German patent publications no. DE-A-29 06 193, 32 20 257, 33 20 077 and 35 21 432. The photochromic reaction involves the opening of a heterocyclic ring at the spiro location to form a betain-like ionic structure comprising an oxygen anion and a nitrogen kation.

Now, the invention contemplates three principal methods to introduce these photochromics into printing inks. These methods will now be described more in detail.

In all methods, one or more photochromics can be used, taken from one or more of the aforesaid classes A to C.

The first two methods, numbered as methods I and II, involve the preparation of pigment-like photodyestuffs. These pigment-like photodyes comprise the photochromic embedded in a transparent polymer.

In method I, the photochromic of class A, B or C is incorporated into a thermoplastic, light-transparent polymer by melting together the two components at a temperature comprised between 50° and 150° C. The temperature is selected such that the photochromic is not altered or even destroyed. Of course, the polymer has to be selected such that its melting point or melting range is low enough so that it will form the molten state at a temperature which does not alter the photochromic.

The melt so obtained is mixed thoroughly until perfect homogenization, and the photochromic will be uniformly distributed in the melt as a solution or dispersion.

An adequate inert solvent may be added before melting in order to lower the liquid temperature of the mixture.

Then, the mixture is allowed to cool to ambient temperature. Should a solvent have been used, it is stripped off during or after cooling. The photochromic now forms a solid solution or dispersion with the polymer.

The solid mass so obtained is then broken into lumps which are then micronized in a suitable equipment, e.g. the "Alpine AFG 100" mill, to a particle size in the pigment range, i.e. within 1 and 20 μm. The particulate composition, after micronization, is appropriate for an introduction into binder preparations on standard dispersion equipments such as three roller mills, high-speed dissolvers, or bead mills, known in the art of manufacturing printing inks, to form liquid or pasty inks by adding the other standard ink components, for various technical applications.

Such thermoplastic polymers for embedding the photochromic must further be selected which are free from groups which would interfere with the photocoloration reaction, especially free from carboxyl groups, which will form a barrier for oxygen, and which are inert to any other component of the printing ink such as solvents or binders, in order to maintain their protecting function for the photochromic and to ascertain that they will not be attacked by, e.g., a solvent of the ink so that their pigment-like configuration is not altered.

Preferred thermoplastic resins which fulfill the above mentioned conditions, are for example cellulose derivatives, polyamides, acrylic polymers and copolymers, polyvinylic resins, hydrocarbon resins such as polyolefines; polyesters, polycarbonates, or mixtures thereof.

The micronized pigment-like, particulate solid solutions of the photochromic in the thermoplastic resin, obtained in this Method I, are especially well suited for incorporation into liquid printing ink vehicules which are unable to dissolve or swell the thermoplastic resin of the protected photochromic. The resulting photochromic ink constitutes an aqueous or a non-aqueous dispersion of a photochromic embedded in a thermoplastic host polymer.

Method II involves the encapsulation of a photochromic in a transparent polymer shell, in the form of microcapsules.

The microencapsulated photochromic dyestuff is prepared by encapsulation of the photochromic, selected from above described classes A, B or C, in aprotic resins or solvents according to the well known methods of microencapsulating or coacervation using gelatine or acacia gum as a wall material, or according to U.S. Pat. Nos. 4,428,978 and 4,517,141 which are incorporated herein by reference.

According to U.S. Pat. No. 4,428,978, aqueous suspensions containing 35 to 60% by weight of microcapsules having a size of from 1 to 20 μm (microns) are prepared from polyisocyanates and hydrogen active compounds by a boundary surface polyaddition process. After polyaddition under shearing conditions, the suspension of the microcapsules may be dried to prepare dry microcapsules. The microcapsules, comprising the enclosed photochromic, are then incorporated into printing ink vehicules in any standard dispersing equipment, usually in simple butterfly mixers or dissolvers under limited shear rates for not damaging the microcapsules.

Method III: It has surprisingly been found that photochromics of aforesaid classes A, B and C can, under certain conditions, be introduced directly into printing ink vehicules. In these inks, the photochromics are found to be embedded, after drying of the ink, in the binder, and are protected from alterations by oxygen or ionic species.

The conditions for the incorporating according to Method III are the following: The amount and the nature of functional groups of the selected binder resin of the ink or those created during chemical hardening, must be such that they are unable to interfere with the photochromic reactions, i.e. ring opening and ring closure reactions, involved in photocoloration and decoloration. In particular, the formation and presence of ions are to be excluded. As solvents, hydrocarbons are preferred.

Functional groups particularly to be excluded in the molecules of the ink components are carboxy groups and their salts. Ionic polymerization initiators such as cobalt or manganese octoates are to be excluded. Free radical forming initiators and free radical induced chemical hardening reactions are surprisingly not interfering with the photochromic reaction and may be permitted in the system. This is of greatest importance since chemical hardening on the basis of free radical induced crosslinking or polymerization can be performed in this method, giving rapidly drying and high performance prints, which is not attainable with mere physical drying.

Any kind of polymeric resin can be used in Method III which is compatible with the solvents being used and which has an acid number below 10, expressed as mg KOH per gram of resin, generally known for the use in offset, lithographic, letterpress and intaglio (plate printing) inks.

Examples for free radical curable resins which may be used in Method III are epoxyacrylates, polyester acrylates, urethane acrylates and the corresponding monomeric compositions—where polymerization is effected in situ—, namely TMPTA (trimethylolpropane triacrylate), PTA (pentaerytritol triacrylate) and HDDA (hexanediol diacrylate) for the preparation of UV hardening offset, litho and letterpress inks.

Furthermore, thermoplastic polymers as mentioned for Method I may be used, as far as they respond to the above defined conditions and limit oxygen diffusion, since photochromics are known to be oxygen sensitive, such as polycarbonates, polyethers and some cellulose derivatives like cellulose acetobutyrate or acetopropionate.

The invention contemplates different printing inks. The printing methods the printing inks of the invention are provided for are the following:

flexographic printing, gravure or heliogravure printing, intaglio (steel engraving) or plate printing, letterpress printing, indirect letterpress or dry offset printing, lithographic or wet offset printing, and screen printing.

All these printing methods are well known to the man skilled in the art. It is furthermore well known that the composition and most physical properties of printing inks must be adapted to the respective printing methods. For example, gravure printing inks have a much lower viscosity than intaglio printing inks. The different basic ink compositions are also well known to the one skilled in the art and will therefore not be described here in detail.

The photochromic printing inks of the invention will contain one or several photochromics or photochromic dyestuffs in concentrations comprised between about 0.5 and about 50% by weight, referred to the total weight of vehicle, binder and photochromic. The inks of this invention are to be used for the printing of identification or forgery detection marks or patterns on security documents. This term comprises bank notes, checks, traveler's checks, stamps, shares, passports, labels and similar printed documents for which measures against counterfeiting are indicated.

As it has already briefly been stated above, the preferred use of the printing inks of this invention is the printing of security documents in order to allow identification and detection of falsifications.

The inks of this invention have been developed for being used simultaneously with conventional printing inks for the printing of security documents, i.e. on the same machines and by simple substitution of one of the normally used printing inks. For example, a banknote can be designed such that normally blue lines are printed in the blue inking apparatus of a multicolor offset printing press with a photochromic printing ink of the invention, and these blue lines become only visible after exposure to U.V. light. In this manner, a counterfeited banknote will easily be recognized. Details are given below.

The printed detection marks are normally invisible. On activation as described, a reversible photochromic coloration takes place which is capable of being detected by normal visualization. However, especially for short-lasting photocoloration, this invention further contemplates a detection method. This method may be carried out in special detection devices and comprises the irradiation of the document under test with energy radiation having a wavelength capable of being absorbed by the detection mark of the document, printed with a photochromic ink and adapted to the light range of the photochromic reaction, for example using an UV lamp having an average power of from 2 to 25 watts, then sensing the photocoloration and interpreting the color change, and finally desactivation for the reversal of the photocoloration. The sensing of the photocoloration may be effected by the human eye or by appropriate color sensitive electronic components known per se, such as photodiodes, phototransistors, light dependent resistors, PIN diodes etc., which sense the color difference before and after the photochromic reaction. An electronic comparator, known per se too, will then give a signal responsive to the color change.

Desactivation or reversal of color may be effected by gentle warming of the document, by IR radiation, or by another energy irradiation which brings about the reverse photoreaction.

The following examples are given to allow a still better understanding of the invention but will not limit the invention thereto.

In the Examples, all parts and percentages are by weight if not otherwise indicated.

EXAMPLES 1 to 5

Method I

Example 1. Aqueous ink for gravure and flexographic printing

Part 1

3 parts of a photochromic compound of class A above are first dissolved in 57 parts of cellulose acetate propionate (CAP 504—0,2—Eastman), 20 parts of toluene and 20 parts of ethanol by heating the mixture to 60° C. for 15 minutes.

The mixture is then dried at 100° C. for fifteen hours under reduced pressure until total evaporation of solvents. The solid solution obtained is broken up and then micronized, and the finely divided particles thus obtained having a size of from 1 to 20 microns are incorporated in the following ink formulation by means of a three roller mill.

Part 2

An aqueous heliographic and flexographic ink is formulated as follows:

|  | % |
| --- | --- |
| 48% solids emulsion of acrylic polymers in water (Joncryl 89 - Johnson) | 69 |
| 49% solids emulsion of acrylic polymers in water (Joncryl 74 - Johnson) | 6 |
| Antifoaming agent (Silicone DC 3 - Dow Corning) | 0.02 |
| Polyethylene wax (Ceridust VP 3715 - Hoechst) | 1.0 |
| Isopropyl alcohol | 7.98 |
| Water | 3 |
| Solid solution of photochromic dye in cellulose acetate proprionate, as prepared above | 13 |

The two emulsions of acrylic polymers are mixed with the antifoaming agent. Polyethylene wax is dispersed therein for ten minutes in a ball mill. Finally isopropyl alcohol, water and the photochromic dyestuff are incorporated into the mixture by means of a ball mill.

After conventional printing on paper and drying, the colorless print turns blue when irradiated with light having a wavelength of about 366 nm.

EXAMPLE 2

Example 1 was repeated with the exception that a photochromic of Class B above was substituted for the same amount of photochromic A.

An aqueous photochromic printing ink for gravure and flexographic printing was obtained.

After conventional printing on paper and drying, the colorless print turns pink when irradiated with light having a wavelength of about 366 nm.

EXAMPLE 3

Example 1 was repeated with the exception that a photochromic of Class C above was substituted for the same amount of photochromic A.

An aqueous photochromic printing ink for gravure and flexographic printing was obtained.

After conventional printing on paper and drying, the colorless print turns green when irradiated with light having a wavelength of about 366 nm.

EXAMPLE 4

Photochromic intaglio ink

Part 1 of Example 1 was repeated to prepare a solid solution of a photochromic of class A in cellulose acetate propionate, having a concentration of 5% by weight, and a particle size comprised between 1 and 20 microns. Then, a photochromic intaglio ink for engraved steel plate printing of detection marks on bank notes was prepared by mixing the following ingredients under gentle heating on a three roller mill:

|  | % |
| --- | --- |
| Addition product of tung oil and maleic acid modified phenolic resin in a high boiling mineral oil (PKWF 28/31) | 35% |
| Long oil alkyd resin in ink solvent 27/29 (Shell Ch. Ind.) | 7.5% |
| Alkylphenolic resin modified with raw tung oil in ink solvent 27/29 (Shell Ch. Ind.) | 16.0% |
| Polyethylene wax | 1.5% |
| Solid solution of photodye A in cellulose acetate propionate (Example 1, part 1) | 39.7% |
| Cobalt octoate (11% metal) | 0.05% |
| Manganese octoate (10% metal) | 0.10% |
| Lead octoate (38% metal) | 0.15% |

The use of photochromics of classes B and C, replacing the photodye of class A, resulted in other useful intaglio printing inks.

EXAMPLE 5

Photochromic offset and litho printing ink

Part 1 of Example 1 was repeated to prepare a solid solution of 5% by weight of a photochromic compound of class A above in cellulose acetate propionate having a particle size of 1 to 20 microns.

Then, a photochromic offset and litho printing ink for the printing of detection marks was prepared by mixing the following ingredients:

|  | % |
| --- | --- |
| Phenolic resin modified rosin cooked with linseed oil | 24 |
| Long oil alkyd (Alftalat AL810 - | 35 |

-continued

|  | % |
| --- | --- |
| Reichhold Albert Chemie AG) | |
| Polyethylene wax (PE 130 - Hoechst) | 2 |
| Ink solvent 27/29 (Shell Industrial Chemicals) | 2 |
| Cooked linseed oil | 5 |
| Solid solution of photodye A in cellulose acetate propionate (5%) (Example 1, part 1) | 26.2 |
| Titanium dioxide | 5 |
| Cobalt octoate (10% cobalt) | 0.8 |

The ink, after printing and drying, gives a blue photochromic coloration under irradiation.

This Example was repeated except that a photochromic of class B and class C, respectively, was replaced for the photochromic of class A. These inks, after printing and drying, resulted in pink or green photochromic colorations, respectively, under irradiation.

EXAMPLE 6

Photochromic intaglio printing ink Method II
Part 1: microcapsules 5 parts of a photochromic of class A are dissolved in 50 parts of chloroform to obtain a clear solution A. Following the encapsulating procedure described in U.S. Pat. No. 4,517,141, solution A is added slowly at room temperature to 270 parts of a stirred solution of 0.65 parts of polyvinyl alcohol, 1.35 parts of xanthan gum, and 9 parts of diethyl tolylene diamine in 268 parts of distilled water. The shearing rate is increased for 1 minute resulting in the formation of a fine oil-in-water emulsion. Then, the stirrer speed is reduced, and 180 parts of a solution of 20 parts of powdered hexamethylene diisocyanate, sodium bisulfite adduct, in 160 parts of a colloid solution containing 0.25% of polyvinyl alcohol and 0.50% of xanthan gum, are added to the diamine/photochromic emulsion.

Emulsification is enhanced by applying high shear rate conditions, and the slurry obtained is transferred into a reaction vessel equipped with a reflux condenser and heated for 6 hours to about 60° C. under gentle stirring. Then, the slurry is spray dried.

Dry, transparent microcapsules are obtained having a diameter between 1 and 20 micrometers and containing about 10% of the photochromic. When irradiated with light having a wavelength of about 366 nm, a strong blue photochromic effect is obtained.

Part 2: printing ink

An intaglio (steel plate) printing ink is obtained by blending the following ingredients under gentle warming on a three roller mill:

| Addition product of tung oil and maleic acid modified phenolic resin in a high boiling mineral oil | 35% |
| --- | --- |
| Long oil alkyd resin in ink solvent 27/29 (Shell) | 7.5% |
| Raw tung oil modified alkylphenol resin in ink solvent 27/29 (Shell) | 16% |
| Polyethylene wax | 1.5% |
| Microcapsules of part 1 of this Example | 35% |
| Titanium dioxide | 4.7% |
| Cobalt octoate (11% metal) | 0.05% |
| Manganese octoate (10% metal) | 0.10% |
| Lead octoate (38% metal) | 0.15% |

After conventional printing on paper and drying, a nearly colorless print is obtained which turns blue when irradiated with light having a wavelength of about 366 nm.

When the photochromic of class A in this Example is replaced in part 1 by the same amount of a photochromic of classes B or C, excellent intaglio printing inks are also obtained.

EXAMPLES 7 to 18

Method III

EXAMPLE 7

Photochromic silk screen ink

A screen ink formulation are prepared from the following ingredients using the indicated amounts:

|  | % |
| --- | --- |
| Ethyl cellulose (N7-Hercules) | 16 |
| Ethoxypropanol | 16 |
| Shellsol A | 50 |
| Calcium carbonate | 8 |
| Titanium dioxide | 7 |
| Photochromic of class A | 3 |

The ink is prepared by mixing all these ingredients together, except of calcium carbonate and titanium dioxide, and heating the mixture up to 80° C. shortly in order to achieve a complete solution of the photochromic material. Calcium carbonate and titanium dioxide are then incorporated into the solution by means of a three roller mill. The final printing viscosity of the ink is about 40 poises at 25° C.

After conventional printing on paper and drying, the colorless print turns blue when irradiated with light at 366 nm wavelength.

EXAMPLE 8

The same ingredients as in Example 7 are used with the same amounts for the screen ink no 2 except that the photochromic of class A is replaced by a photochromic of class B at the same level (3%).

After conventional printing and drying, the print turns pink when irradiated with light at 366 nm wavelength.

EXAMPLE 9

The same ingredients as in Example 7 are used at the same amounts for the screen ink no 2 except that the photochromic of class A is replaced by a photochromic of class C at the same level (3%).

After conventional printing and drying, the print turns green when irradiated with light at 366 nm wavelength.

EXAMPLE 10

Photochromic gravure printing ink

A gravure ink, based on a nitrocellulose resin, is prepared from the following ingredients using the indicated quantities:

|  | % |
| --- | --- |
| Nitrocellulose (A280 - Société Nationale des Produits Explosifs S.N.P.E., France) | 15 |
| Dibutyl phthalate | 6 |
| Ethanol | 34.5 |
| Ethoxypropanol | 10 |
| Ethyl acetate | 31.5 |
| Photochromic of class A | 3 |

All the ingredients are mixed together at 50° C. to obtain a clear solution. The ink is adjusted to the suitable printing viscosity by means of adding ethyl acetate.

When the photochromic of class A in this Example is replaced by the same amount of a photochromic of class B or C, excellent photochromic gravure printing inks are also obtained.

EXAMPLE 11

Photochromic gravure printing ink

A gravure printing ink, based on a polyamide resin, is prepared from the following ingredients using the indicated quantities:

|  | % |
| --- | --- |
| Polyamide (Eurelon 962 - Schering) | 30 |
| Ethanol | 45 |
| Propyleneglycol methyl ether | 5 |
| Ethyl acetate | 17 |
| Photochromic of class A | 3 |

The manufacturing process of this gravure ink is the same as in Example 10.

When the photochromic of class A in this Example is replaced by the same amount of a photochromic of class B or C, excellent photochromic gravure printing inks are also obtained.

EXAMPLE 12

Photochromic gravure printing ink

A gravure ink, based on an ethylcellulose resin, is prepared from the following ingredients using the quantities indicated and applying the method of Example 10:

|  | % |
| --- | --- |
| Ethyl cellulose (N7 - Hercules) | 10 |
| Propyleneglycol methyl ether | 10 |
| Ethanol | 28 |
| Isopropyl acetate | 44 |
| Dibutyl phthalate | 5 |
| Photochromic of class A | 3 |

The final printing viscosity is adjusted by means of adding isopropyl acetate.

When the photochromic of class A in this Example is replaced by the same amount of a photochromic of class B or C, excellent photochromic gravure printing inks are also obtained.

EXAMPLE 13

Photochromic heliographic printing ink

A heliographic ink, based on a vinyl resin, is formulated as follow:

|  | % |
| --- | --- |
| Polyvinyl resin (Rhodopas AS 85-15-Rhone Poulenc) | 25 |
| Dibutyl phthalate | 3 |
| Epoxy plasticizer (Edenol D81 - Henkel) | 2 |
| Methyl ethyl ketone | 35 |
| Isopropyl acetate | 32 |
| Photochromic of class A | 3 |

The manufacturing process is the same as in Example 10.

When the photochromic of class A in this Example is replaced by the same amount of a photochromic of class B or C, excellent photochromic heliographic printing inks are also obtained.

EXAMPLE 14

Photochromic flexographic printing ink

The ink, based on a nitrocellulose resin, is formulated as follows:

|  | % |
| --- | --- |
| Nitrocellulose (N7 - Hercules) | 20 |
| Fatty amide (Armid O, Armour) | 1.5 |
| Promotex PE 80 A | 8 |
| Dibutyl phthalate | 5 |
| Propyleneglycol methyl ether | 18 |
| Ethanol | 35.5 |
| Ethyl acetate | 9 |
| Photochromic of class A | 3 |

All the ingredients are mixed together at 50° C. to obtain a clear solution. The final printing viscosity is obtained by adding a suitable quantity of ethyl acetate.

When the photochromic of class A in this Example is replaced by the same amount of a photochromic of class B or C, excellent flexographic printing inks are also obtained.

EXAMPLE 15

Photochromic flexographic printing ink

This ink, based on a polyamide resin, is formulated as follows:

|  | % |
| --- | --- |
| Polyamide (Eurelon 945 - Schering) | 36 |
| Inalco RL 727 | 9 |
| Fractionated gasoline (100–125° C.) | 27 |
| Isopropyl alcohol | 25 |
| Photochromic of class A | 3 |

The manufacturing process is the same as in Example 12.

When the photochromic of class A in this Example is replaced by the same amount of a photochromic of class B or C, excellent flexographic printing inks are also obtained.

EXAMPLE 16

Offset printing ink

An offset printing ink is prepared from the following ingredients:

|  | % |
| --- | --- |
| Long oil alkyd modified vinyltoluene, acid number < 10 (Alsynol S41N - DSM Resins) | 63 |
| Long oil alkyd, acid number < 10 (Alftalat AL 810 - Reichhold Albert Chemie AG) | 15 |
| Alkylphenolic resin cooked with raw wood oil in aliphatic hydrocarbons | 5 |
| Ink solvent 27/29 (Shell Industrial Chemicals) | 2 |
| Titanium dioxide | 12 |
| Photochromic of class A | 3 |

The photochromic compound is mixed with the long oil alkyd and heated for a few seconds up to 80° C. to obtain a clear solution. This solution is mixed with the other ingredients by means of a three roller mill.

The printing viscosity is about 10 Pa.s at 25° C.

When the photochromic of class A in this Example is replaced by the same amount of a photochromic of class B or C, excellent photochromic offset printing inks are also obtained.

EXAMPLE 17

Photochromic UV curable offset printing ink

A photochromic UV curable offset printing ink is formulated as follows:

|  | % |
| --- | --- |
| Trimethylolpropane triacrylate (TMPTA) | 20 |
| Photochromic of class A | 3 |
| Epoxyacrylate | 56 |
| Precipitated CaCO3 | 7 |
| Titanium dioxide | 5 |
| Benzophenone | 4 |
| Stabilizer (hydroquinone) | 3 |
| Photoinitiator (Irgacure 651) | 2 |

First 20 parts of TMPTA are mixed together with 3 parts of a photochromic of class A and 1.5 parts of stabilizer under gentle heating (40° C.) in order to obtain a clear solution.

The other ingredients are then added by means of a three roller mill.

After conventional printing on paper and drying, and cancellation of the blue color consecutive to U.V. irradiation during chemical drying, the print turns blue when irradiated again with light at 366 nm wavelength.

When the photochromic of class A in this Example is replaced by the same amount of photochromic of class B or C, excellent photochromic printing inks are also obtained.

EXAMPLE 18

Mixed yellow photochromic U.V. curable offset printing ink

A yellow photochromic U.V. curable printing ink is formulated as follows:

| TMPTA | 20% |
| --- | --- |
| Photochromic of class A | 3% |
| Expoxyacrylate | 56% |
| Precipitated CaCO$_3$ | 4% |
| Yellow pigment (Irgalite BWA) | 8% |
| Benzophenone | 4% |
| Stabilizer (hydroquinone) | 3% |
| Photoinitiator (Irgacure 651) | 2% |

The manufacturing procedure is the same as in example 17.

After conventional printing on paper and drying, and cancellation of the green color consecutive to U.V. irradiation during drying, the print is yellow. After exposure to light having a wavelength of 366 nm the yellow print turns green.

The application of reversibly photochromic printing inks for the manufacturing of paper values such as banknotes, cheques, bonds, stamps, passports and others will now be discussed.

The principle printing processes involved in the production of the above mentioned securities are offset printing, litho (wet offset), letterpress printing and intaglio (steel engraving) or plate printing.

The ink formulations given as examples in this patent are perfectly adapted to be used as such and in combination with conventional security inks on traditional equipment.

A) Production of a banknote with photochromic properties on sheet fed machines.

The first step in the production of a banknote involves 5 printing of the background designs on machines like Super Simultan III manufactured by DLRG using banknote paper as specified for this purpose.

This machine is designed to print up to eight different colors on each side of the sheet simultaneously.

The printing process can be carried out in dry offset technique or in the litho (wet offset) process.

A photochromic offset ink as decribed in Example 16 is perfectly capable to replace any one of the eight colors in order to confer photochromic properties to a part of the design work. The photochromic ink may be printed in superimposition on or juxtaposition with other conventional inks and is used to create photochromic design in form of complicated line works, patterns or simple marks following the requirements of the security document.

After drying for about one week, these offset printed sheet will be processed as usually on intaglio (plate) printing presses and numbering machines to give the finished banknote.

B) Production of cheques with photochromic properties

Usually bank cheques are produced by offset printing only.

This kind of securities can be printed on a great number of different machinery including Simultan printing machines as mentioned above or four-color offset printing machines as for example manufactured by Roland.

Again inks formulated as described in Example 5 or 16 may replace any of the conventional inks to confer photochromic properties to the product.

C) Production of banknotes bearing the photochromic properties in the intaglio ink.

In this case the offset printing is done in the traditional way as known in the art of banknote production.

For the intaglio printing different machinery using either paper wiping or cylinder wiping (using the so called "water wiping" or "trichloroethylene wiping" processes) can be applied.

The machinery can be conceived to print on a continuous band of banknote paper or on sheets.

As an example for such a printing machine the Super Intaglio Color III manufactured by DLRG (De La Rue Giori) shall be mentioned.

Usually three colors are printed on each side of the security document in two passes.

An ink formulated following Example 4 is perfectly suitable to replace one of the conventional inks in the case of using any of the aforementioned printing techniques in order to confer photochromic properties to a part of the design.

The photochromic ink may be applied together with a conventional ink in the same inking train or alone in a separated inking train.

D) Traveller cheques with photochromic properties

This kind of security documents may be manufactured by using one of the techniques A, B or C on the appropriate printing substrate.

The Examples described above shall give a better understanding of the special printing process involved in manufacturing of security documents but shall certainly not be understood as exhaustive list of possibilities.

The preceding Examples show clearly the surprising and outstanding advantages of this invention. It is evident that the practical realization of the invention in the context of the claimed matter may be varied or modified according to the knowledge of the one skilled in the art without departing from the principles and the scope of this invention. Particularly in the field of printing, numerous modifications and improvements are possible in formulating printing inks. However, such modifications and improvements are comprised in the scope of protection conferred by this invention.

What is claimed is:

1. A method for preparing a photochromic printing ink for the printing of ink accepting surfaces, comprising the following steps:

(A) providing at least one photochromic compound and a thermoplastic, light-transparent polymer not reactive with said photochromic compound and being a barrier for oxygen and for ink components capable of irreversibly interfering with the photochromic reaction sites of said photochromic compound, (B) melting together said photochromic compound and said polymer at a temperature comprised between 50° and 150° C. to form a liquid solution or dispersion of the photochromic compound within the polymer, (C) allowing said liquid solution or dispersion to cool to ambient temperature to form a solid solution or dispersion, (D) breaking up the solid mass obtained in step (C) to lumps and micronizing the lumps to particles having a size of from 1 to 20 micrometers, (E) incorporating the particles obtained in step (D) into a printing ink formulation and (F) collecting the obtained ink comprising a particulate polymeric binder, a liquid phase, and at least one photochromic compound, embedded in said polymeric binder.

2. The method of claim 1 wherein an inert solvent for the polymer is added in step (B) and stripped off in step (C).

* * * * *